United States Patent
Meng (10) Patent No.: US 9,882,698 B2
(45) Date of Patent: Jan. 30, 2018

(54) DEVICE AND METHOD OF HANDLING RESOURCE FOR DEVICE-TO-DEVICE COMMUNICATION

(71) Applicant: HTC Corporation, Taoyuan (TW)

(72) Inventor: Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 86 days.

(21) Appl. No.: 14/816,084

(22) Filed: Aug. 3, 2015

(65) Prior Publication Data

US 2016/0036577 A1    Feb. 4, 2016

Related U.S. Application Data

(60) Provisional application No. 62/032,646, filed on Aug. 4, 2014, provisional application No. 62/037,126, filed on Aug. 14, 2014.

(51) Int. Cl.
    *H04L 5/00*            (2006.01)
    *H04W 76/02*        (2009.01)
    (Continued)

(52) U.S. Cl.
    CPC .......... *H04L 5/0055* (2013.01); *H04L 1/1812* (2013.01); *H04L 1/1854* (2013.01);
    (Continued)

(58) Field of Classification Search
    CPC ....... H04L 5/0055; H04L 5/14; H04L 1/1812; H04L 5/0048; H04L 1/1854; H04L 1/1864; H04W 76/023; H04W 72/042
    See application file for complete search history.

(56) References Cited

U.S. PATENT DOCUMENTS

2010/0232373 A1*   9/2010   Nory ................ H04W 72/1289
                                                       370/329
2014/0056220 A1*   2/2014   Poitau ................ H04W 40/246
                                                       370/328

(Continued)

OTHER PUBLICATIONS

3GPP TR 36.828 V11.0.0 (Jun. 2012) Technical Report 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11).

(Continued)

*Primary Examiner* — Ajay Cattungal
(74) *Attorney, Agent, or Firm* — Winston Hsu (57) ABSTRACT

A network for handling resources for a device-to-device (D2D) communication in a time-division duplexing (TDD) system comprises a storage unit for storing instructions and a processing means coupled to the storage unit. The processing means is configured to execute the instructions stored in the storage unit. The instructions comprise selecting a reference configuration for at least one downlink (DL) transmission of a communication device from a plurality of configuration candidates; determining at least one uplink (UL) subframe for the D2D communication of the communication device according to the reference configuration; transmitting information of the reference configuration to the communication device; transmitting information of the at least one UL subframe to the communication device; and performing the at least one DL transmission with the communication device according to the reference configuration.

20 Claims, 6 Drawing Sheets

(51) Int. Cl.
*H04L 5/14* (2006.01)
*H04L 1/18* (2006.01)
*H04W 72/04* (2009.01)

(52) U.S. Cl.
CPC .............. *H04L 5/0048* (2013.01); *H04L 5/14* (2013.01); *H04W 72/042* (2013.01); *H04W 76/023* (2013.01); *H04L 1/1864* (2013.01)

(56) References Cited

U.S. PATENT DOCUMENTS

| | | | |
|---|---|---|---|
| 2014/0086112 A1* | 3/2014 | Stern-Berkowitz | H04W 72/1289 370/280 |
| 2014/0269338 A1 | 9/2014 | Jung | |
| 2015/0003315 A1* | 1/2015 | Chen | H04W 4/06 370/312 |
| 2015/0085719 A1 | 3/2015 | Yin | |
| 2015/0092757 A1* | 4/2015 | Tiirola | H04L 5/0055 370/336 |
| 2015/0305000 A1 | 10/2015 | Nguyen | |
| 2016/0020849 A1* | 1/2016 | Wu | H04B 7/2615 370/281 |
| 2016/0149687 A1* | 5/2016 | Lei | H04W 16/10 370/280 |
| 2016/0192391 A1 | 6/2016 | Larsson | |
| 2016/0204906 A1 | 7/2016 | Cheng | |
| 2016/0219634 A1 | 7/2016 | Lu | |

OTHER PUBLICATIONS

3GPP TS 36.213 V12.2.0 (Jun. 2014) Technical Specification 3rd Generation Partnership Project; Technical Specification Group Radio Access Network; Evolved Universal Terrestrial Radio Access (E-UTRA); Physical layer procedures (Release 12).
3GPP TSG RAN WG1 Meeting #74 R1-13xxxx Barcelona, Spain, Aug. 19-23, 2013 Source: MCC Support Title: Draft Report of 3GPP TSG RAN WG1 #73 v0.2.0 (Fukuoka, Japan, May 20-24, 2013).
3GPP TSG RAN WG1 Meeting #75 R1-135001 San Francisco, USA, Nov. 11-15, 2013 Source: MCC Support Title: Final Report of 3GPP TSG RAN WG1 #74bis v1.0.0 (Guangzhou, China, Oct. 7-11, 2013).
3GPP TSG RAN WG1 Meeting #76 R1-140001 Prague, CZ Rep., Feb. 10-14, 2014 Source: MCC Support Title: Final Report of 3GPP TSG RAN WG1 #75 v1.0.0 (San Francisco, USA, Nov. 11-15, 2013).
Office action dated Jun. 5, 2017 for the U.S. Appl. No. 14/818,286, filed Aug. 4, 2015, p. 1-34.
Notice of Allowance dated Oct. 11, 2017 for the U.S. Appl. No. 14/818,286, filed Aug. 4, 2015, p. 1-13.

* cited by examiner

| UL/DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

DEVICE AND METHOD OF HANDLING RESOURCE FOR DEVICE-TO-DEVICE COMMUNICATION

CROSS REFERENCE TO RELATED APPLICATIONS

This application claims both the benefit of U.S. Provisional Application No. 62/037,126, filed on Aug. 14, 2014 and the benefit of U.S. Provisional Application No. 62/032,646, filed on Aug. 4, 2014.

BACKGROUND OF THE INVENTION

1. Field of the Invention

The present invention is related to a communication device and a method used in a wireless communication system, and more particularly, to a communication device and a method of handling collision of device-to-device communication in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system operating in a frequency-division duplexing (FDD) mode (or simply FDD system), transmission directions of subframes of a frequency band in the LTE/LTE-A system operating in a time-division duplexing (TDD) mode (or simply TDD system) may be different. That is, the subframes in the same frequency band are divided into UL subframes, downlink (DL) subframes and special subframes according to the UL/DL configuration specified in the 3GPP standard.

Figure 1:
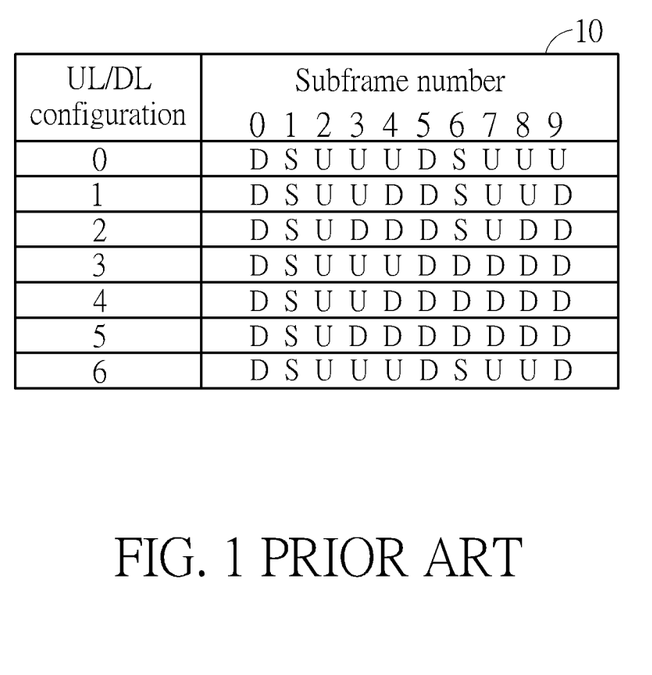
FIG. 1 is a table of the UL/DL configurations with subframes and corresponding directions.

FIG. 1 is a table 10 of the UL/DL configurations with subframes and corresponding directions according to the prior art. In FIG. 1, 7 UL/DL configurations are shown, wherein each of the UL/DL configurations indicates a set of transmission directions (hereinafter, directions, for short) for 10 subframes, respectively. Each subframe is indicated with a corresponding subframe number (i.e., subframe index) in FIG. 1. In detail, "U" represents that the subframe is a UL subframe where UL data is transmitted, and "D" represents that the subframe is a DL subframe where DL data is transmitted. "S" represents that the subframe is a special subframe where control information and maybe data (according to the special subframe configuration) is transmitted.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other (e.g., directly) according to the D2D communication, and the eNB may not need to forward the packets transmitted between the UEs. According to the D2D communication, the UEs may communicate with each other via UL resources (e.g., UL subframes configured by the eNB). In general, the D2D communication may also be seen as a D2D service (i.e., proximity-based service (ProSe)). The D2D service can be a ProSe direct discovery or a ProSe direct communication. In addition, a D2D subframe, D2D transmission, D2D communication and D2D discovery can be termed as a sidelink subframe, sidelink transmission, sidelink communication and sidelink discovery, respectively.

According to the currently developed 3GPP standard, frequency-division multiplexing (FDM) between a D2D communication and a device-to-cellular (D2C) communication is not allowed. The D2D communication and the D2C communication may occur on a same carrier. That is, a UE may be scheduled to perform a D2D transmission and a D2C transmission in a subframe of the same carrier. The D2D transmission and the D2C transmission cannot be performed successfully, because only one of the transmissions can be performed in the subframe. Accordingly, operations of the D2D communication and the D2C communication cannot proceed regularly.

Thus, how to solve the collision between the D2D communication and the D2C communication is an important topic to be discussed.

SUMMARY OF THE INVENTION

The present invention therefore provides a communication device and a method for handling resource for a device-to-device communication to solve the abovementioned problem.

A network for handling resources for a device-to-device (D2D) communication in a time-division duplexing (TDD) system comprises a storage unit for storing instructions and a processing means coupled to the storage unit. The processing means is configured to execute the instructions stored in the storage unit. The instructions comprise selecting a reference configuration for at least one downlink (DL) transmission of a communication device from a plurality of configuration candidates; determining at least one uplink (UL) subframe for the D2D communication of the communication device according to the reference configuration; transmitting information of the reference configuration to the communication device; transmitting information of the at least one UL subframe to the communication device; and performing the at least one DL transmission with the communication device according to the reference configuration.

A network for handling resources for a device-to-device (D2D) communication in a time-division duplexing (TDD) system comprises a storage unit for storing instructions and a processing means coupled to the storage unit. The processing means is configured to execute the instructions stored in the storage unit. The instructions comprise determining at least one uplink (UL) subframe for the D2D communication of a communication device; selecting a reference configuration for at least one downlink (DL) transmission of the communication device from a plurality of configuration candidates according to the at least one UL subframe; transmitting information of the reference configuration to the communication device; transmitting information of the at least one UL subframe to the communication device; and performing the at least one DL transmission with the communication device according to the reference configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
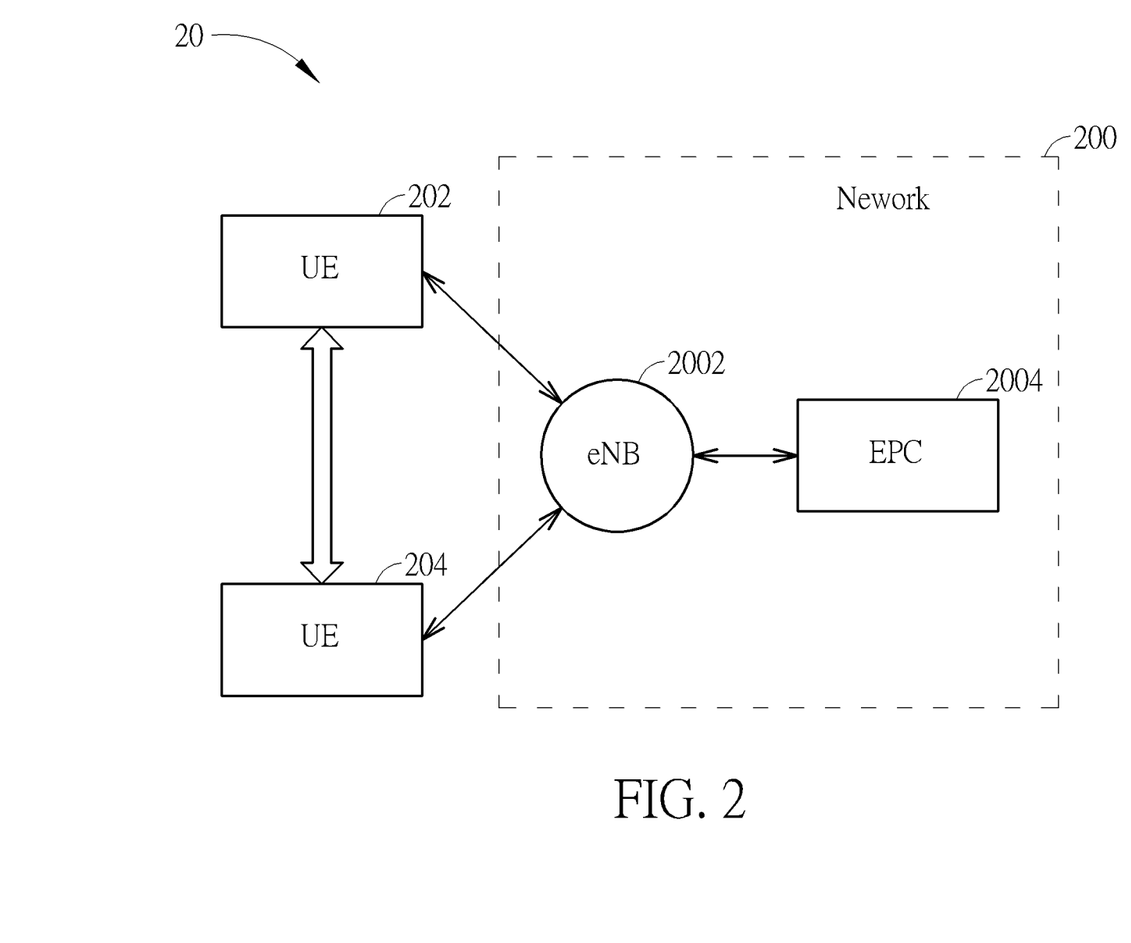
FIG. 2 is a schematic diagram of a wireless communication system according to an example of the present invention.

FIG. 2 is a schematic diagram of a wireless communication system 20 according to an example of the present invention. The wireless communication system 20 is briefly composed of a network 200 and user equipments (UEs) 202 and 204. The wireless communication system 20 may support a time-division duplexing (TDD) mode (e.g., TDD system) and/or a frequency-division duplexing (FDD) mode (e.g., FDD system). In FIG. 2, the network 200 and the UEs 202 and 204 are simply utilized for illustrating the structure of the wireless communication system 20. A UE may communicate with the network 200 according to a device-to-cellular (D2C) communication (i.e., device-to-network (D2N) communication) defined in a communication standard, e.g., the 3rd Generation Partnership Project (3GPP) standard. Practically, the network 200 can be a universal terrestrial radio access network (UTRAN) comprising at least one Node-B (NB) in a universal mobile telecommunications system (UMTS). In another example, the network 200 can be an evolved UTRAN (E-UTRAN) comprising at least one evolved NB (eNB) and/or at least one relay station in a long term evolution (LTE) system, a LTE-Advanced (LTE-A) system or an evolution of the LTE-A system. As an example, the network 200 includes an eNB 2002 connected to an evolved packet core (EPC) 2004 in FIG. 2.

Furthermore, the network 200 can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network 200 receives information transmitted by a UE (e.g., the UE 202 and/or the UE 204), the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A UE (e.g., the UE 202 and/or the UE 204) can be a low cost device (e.g., machine type communication (MTC) device), a device-to-device (D2D) device, a mobile phone, a laptop, a tablet computer, an electronic book, a portable computer system, or combination thereof. In addition, for the D2C communication, the network 200 and the UE can be seen as a transmitter or a receiver according to direction (i.e., transmission direction), e.g., for an uplink (UL), the UE is the transmitter and the network 200 is the receiver, and for a downlink (DL), the network 200 is the transmitter and the UE is the receiver.

In addition, the UEs 202 and 204 may communicate with each other directly, after an initialization (e.g., connection establishment and/or peer discovery) is performed. For example, the initialization may be assisted by the network 200. That is, the UEs 202 and 204 may communicate (e.g., transmit and/or receive signals/packets) with each other according to a D2D communication defined in a communication standard, e.g., 3GPP standard. The UEs 202 and 204 may communicate with each other via UL resources (e.g., UL subframes or UL carriers) determined according to FDD configuration and/or TDD configurations.

Figure 3:
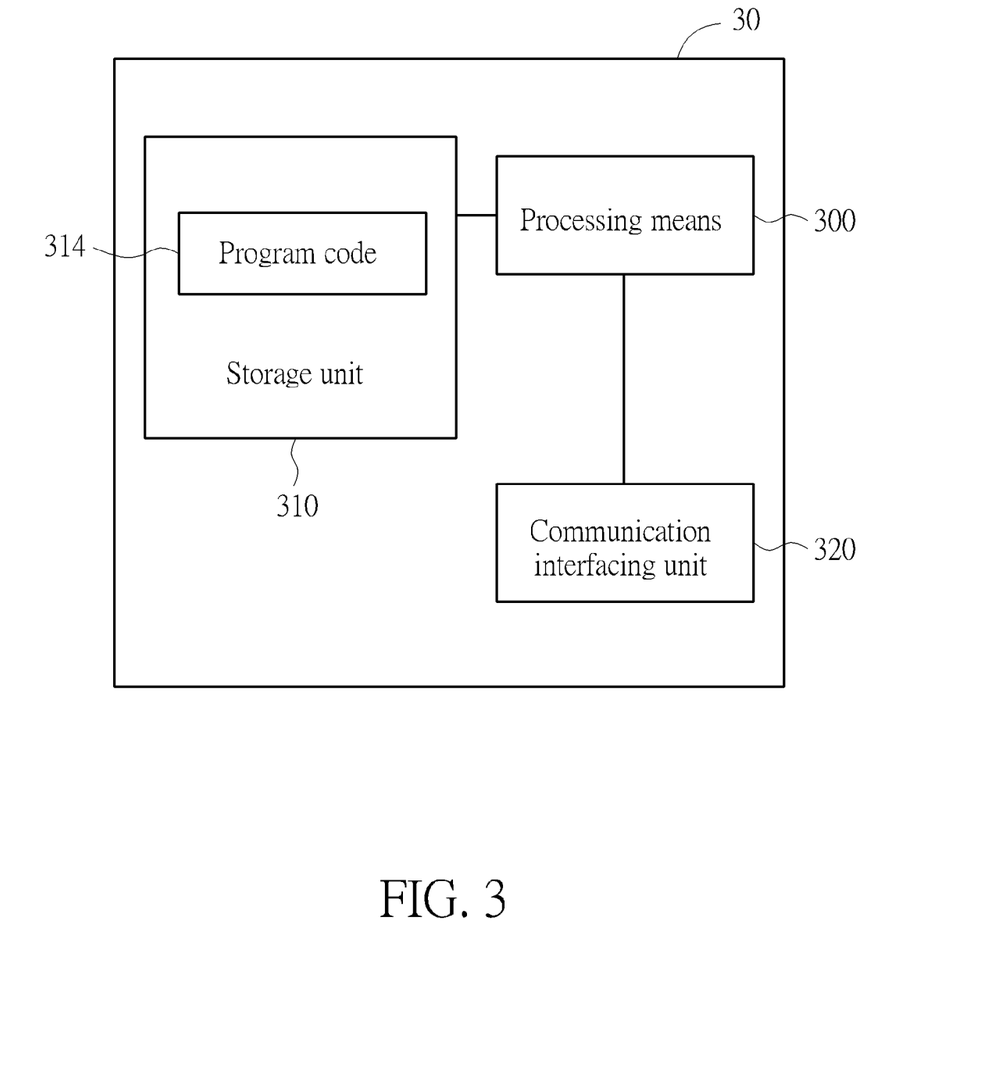
FIG. 3 is a schematic diagram of a communication device according to an example of the present invention.

FIG. 3 is a schematic diagram of a communication device 30 according to an example of the present invention. The communication device 30 may be used for realizing the network 200 (e.g., the eNB 2002 and/or the EPC 2004), the UE 202 and/or the UE 204 shown in FIG. 2, but is not limited herein. The communication device 30 may include a processing means 300 such as a microprocessor or Application Specific Integrated Circuit (ASIC), a storage unit 210 and a communication interfacing unit 320. The storage unit 310 may be any data storage device that may store a program code 314, accessed and executed by the processing means 300. Examples of the storage unit 310 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 320 is preferably a transceiver and is used to transmit and receive signals (e.g., data, signals, messages and/or packets) according to processing results of the processing means 300.

Figure 4:
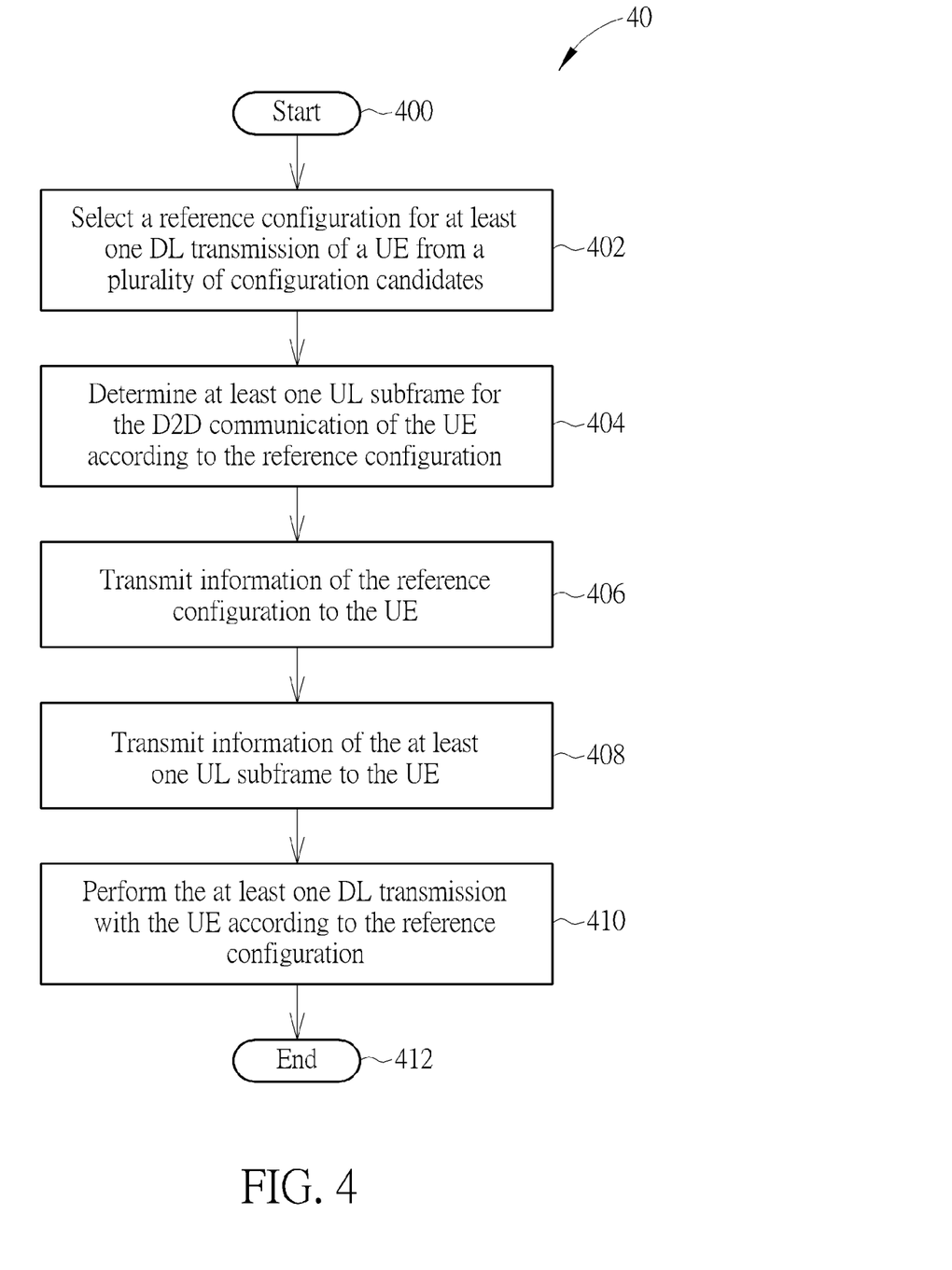
FIG. 4 is a flowchart of a process according to an example of the present invention.

FIG. 4 is a flowchart of a process 40 according to an example of the present invention. The process 40 maybe utilized in a network (e.g., the network 200, the eNB 2002 and/or the EPC 2004) shown in FIG. 2, to handle a resource for a D2D communication in a TDD system. The process 40 maybe compiled into the program code 314 and includes the following steps:

Step 400: Start.

Step 402: Select a reference configuration for at least one DL transmission of a UE from a plurality of configuration candidates.

Step 404: Determine at least one UL subframe for the D2D communication of the UE according to the reference configuration.

Step 406: Transmit information of the reference configuration to the UE.

Step 408: Transmit information of the at least one UL subframe to the UE.

Step 410: Perform the at least one DL transmission with the UE according to the reference configuration.

Step 412: End.

According to the process 40, the network may select a reference configuration for at least one DL transmission of a UE (e.g., the UE 202) from a plurality of configuration candidates, and may determine at least one UL subframe for the D2D communication of the UE according to the reference configuration. Then, the network may transmit information of the reference configuration to the UE, and may transmit information of the at least one UL subframe to the UE. Thus, the network may perform the at least one DL transmission with the UE according to the reference configuration, e.g., a timeline of the reference configuration. The UE may also perform the D2D communication with another UE (e.g., the UE 204) via (e.g., a set of) the at least one UL subframe. In other words, even if the UE has been configured with a UL/DL configuration (e.g., different from the reference configuration), the network may allocate resources for the D2C communication and the D2D communication according to the reference configuration, to resolve the collision of the communications.

A DL transmission mentioned above may be a cellular transmission which triggers a corresponding hybrid automatic repeat request (HARQ) feedback, e.g., acknowledgement (ACK) or negative acknowledgement (NACK). According to the process 40, the HARQ feedback is going to be transmitted in subframe(s) where no D2D transmission is occurred and the collision is avoided, because the DL transmission and the corresponding HARQ feedback are processed (e.g., determined) according to (e.g., timeline of) the reference configuration and the UL subframe(s) for the D2D communication is properly selected by the network. Thus, the collision between the D2C communication and the D2D communication is solved.

Realization of the present invention is not limited to the above description.

In one example, the network may determine the at least one UL subframe in the process 40 such that at least one direction of the at least one UL subframe is not UL according to the reference configuration. As an example, the UE may be configured with the UL/DL configuration 1. The network may determine that the reference configuration is the UL/DL configuration 2 (e.g., select the UL/DL configuration 2 from UL/DL configurations). The network may determine the UL subframe 3 for the D2D communication, because the direction of the UL subframe 3 is not UL according to the UL/DL configuration 2. Similarly, the UL subframe 8 or the UL subframes (3, 8) may be determined for the D2D communication according to the above description. The information of the reference configuration and the selected UL subframe(s) are then transmitted to the UE. In other words, according to the present invention, the network may determine (e.g., select) any set of the UL subframes (3, 8) for the D2D communication, and the set of the UL subframes is indicated to the UE.

The reference configuration in the process 40 may be determined in various ways and according various combinations of conditions. In one example, the reference configuration may be selected according to a DL traffic condition of the UE, an interference level (e.g., measured or received by the network), a cell loading of the network and/or a D2D resource requested by the UE. In one example, the reference configuration may be selected semi-statically or statically. That is, a frequency for updating the reference configuration is not limited. In one example, the selection of the reference configuration may be predetermined in the 3GPP standard. That is, the network may select a predetermined configuration from the configuration candidates according to the 3GPP standard, when selecting the reference configuration.

The information of the reference configuration in the process 40 may be transmitted via a higher layer signaling (e.g., radio resource control (RRC) signaling) or a physical layer signaling (e.g., physical DL control channel (PDCCH) signaling). Similarly, the information of the at least one UL subframe in the process 40 may be transmitted via a higher layer signaling (e.g., RRC signaling) or a physical layer signaling (e.g., PDCCH signaling). In one example, when the physical layer signaling is used for transmitting the information, a corresponding Cell Radio Network Temporary Identifier (RNTI) may be scrambled with the physical layer signaling (i.e., the signaling is scrambled with the RNTI), wherein the RNTI may be a D2D-reference-RNTI. The physical layer signaling may be allocated in a corresponding UE-specific search space, and the UE-specific search space may be different for each UE. Then, the UE may receive the reference configuration from the network based on the abovementioned signaling mechanisms. In addition, the information of the reference configuration and the information of the at least one UL subframe may be transmitted via different signalings, or may be transmitted in a same signaling.

In one example, the plurality of configuration candidates may be determined according to Enhanced Interference Mitigation and Traffic Adaptation (eIMTA) defined in the 3GPP standard. That is, the configuration candidates designed for the eIMTA may be used for determining the reference configuration.

Figure 5:
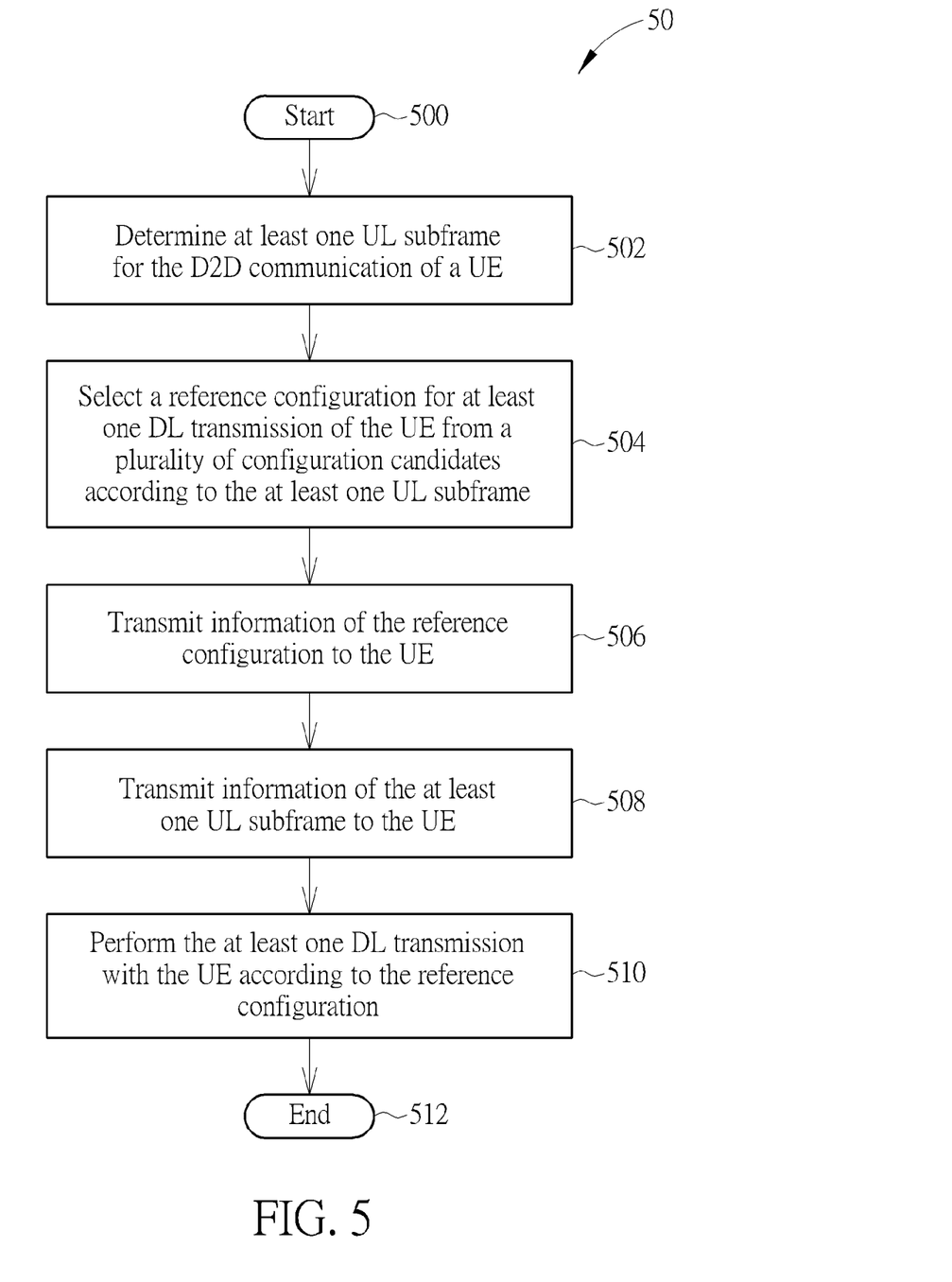
FIG. 5 is a flowchart of a process according to an example of the present invention.

FIG. 5 is a flowchart of a process 50 according to an example of the present invention. The process 50 may be utilized in a network (e.g., the network 200, the eNB 2002 and/or the EPC 2004) shown in FIG. 2, to handle a resource for a D2D communication in a TDD system. The process 50 may be compiled into the program code 314 and includes the following steps:

Step 500: Start.

Step 502: Determine at least one UL subframe for the D2D communication of a UE.

Step 504: Select a reference configuration for at least one DL transmission of the UE from a plurality of configuration candidates according to the at least one UL subframe.

Step 506: Transmit information of the reference configuration to the UE.

Step 508: Transmit information of the at least one UL subframe to the UE.

Step 510: Perform the at least one DL transmission with the UE according to the reference configuration.

Step 512: End.

According to the process 50, the network may determine at least one UL subframe for the D2D communication of a UE (e.g., the UE 202), and may select a reference configuration for at least one DL transmission of the UE from a plurality of configuration candidates according to the at least one UL subframe. Then, the network may transmit information of the reference configuration to the UE, and may transmit information of the at least one UL subframe to the UE. Thus, the network may perform the at least one DL transmission with the UE according to the reference configuration, e.g., a timeline of the reference configuration. The UE may also perform the D2D communication with another UE (e.g., the UE 204) via (e.g., a set of) the at least one UL subframe. In other words, the reference configuration (e.g., different from a UL/DL configuration of the UE) is selected according to the resource(s) determined for the D2D communication, to resolve the collision of the communications A DL transmission mentioned above may be a cellular transmission which triggers a corresponding HARQ feedback, e.g., ACK or NACK. According to the process 50, the HARQ feedback is going to be transmitted in subframe(s) where no D2D transmission is occurred and the collision is avoided, because the DL transmission and the corresponding HARQ feedback are processed (e.g., determined) according to (e.g., timeline of) the reference configuration which is properly selected by the network. Thus, the collision between the D2C communication and the D2D communication is solved.

Realization of the present invention is not limited to the above description.

In one example, the network may select the reference configuration in the process 50 such that at least one direction of the at least one UL subframe is not UL according to the reference configuration. As an example, the UE may be configured with the UL/DL configuration 1. The network may determine (e.g., select) any set of the UL subframes (3, 8) for the D2D communication. Accordingly, the network may determine that the reference configuration is the UL/DL configuration 2 (e.g., select the UL/DL configuration 2 from UL/DL configurations). The information of the reference configuration and the selected UL subframe (s) are then transmitted to the UE. Note that the network may determine the UL subframe 3, the UL subframe 8 or both the UL subframes 3 and 8 for the D2D communication, because the directions of the UL subframe 3 and 8 are not UL according to the UL/DL configuration 2.

The reference configuration in the process 50 may be determined in various ways and according various combinations of conditions. In one example, except the at least one UL subframe, the reference configuration may be further selected according to a DL traffic condition of the UE, an interference level (e.g., measured or received by the network), a cell loading of the network and/or a D2D resource requested by the UE. In one example, the reference configuration may be selected semi-statically or statically. That is, a frequency for updating the reference configuration is not limited. In one example, the selection of the reference configuration may be predetermined in the 3GPP standard. That is, the network may select a predetermined configuration from the configuration candidates according to the 3GPP standard, when selecting the reference configuration.

The information of the reference configuration in the process 50 may be transmitted via a higher layer signaling (e.g., RRC signaling) or a physical layer signaling (e.g., PDCCH signaling). Similarly, the information of the at least one UL subframe in the process 40 maybe transmitted via a higher layer signaling (e.g., RRC signaling) or a physical layer signaling (e.g., PDCCH signaling). In one example, when the physical layer signaling is used for transmitting the information, a corresponding Cell RNTI may be scrambled with the physical layer signaling (i.e., the signaling is scrambled with the RNTI), wherein the RNTI may be a D2D-reference-RNTI. The physical layer signaling may be allocated in a corresponding UE-specific search space, and the UE-specific search space may be different for each UE. Then, the UE may receive the reference configuration from the network based on the abovementioned signaling mechanisms. In addition, the information of the reference configuration and the information of the at least one UL subframe may be transmitted via different signalings, or may be transmitted in a same signaling.

In one example, the plurality of configuration candidates may be determined according to eIMTA defined in the 3GPP standard. That is, the configuration candidates designed for the eIMTA may be used for determining the reference configuration.

Figure 6:
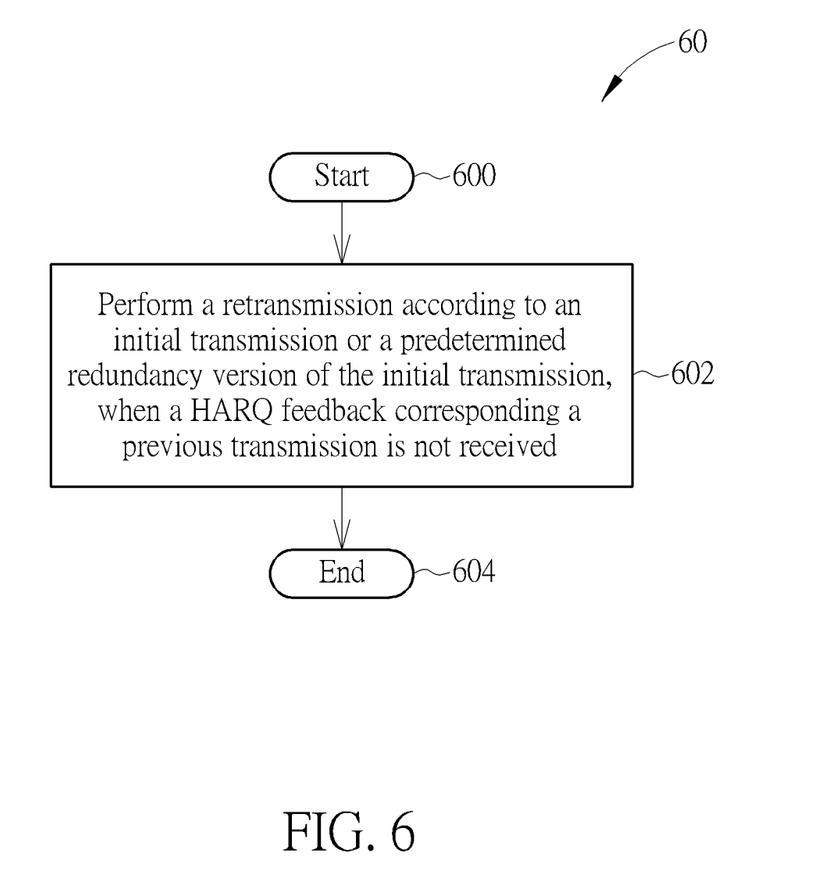
FIG. 6 is a flowchart of a process according to an example of the present invention.

FIG. 6 is a flowchart of a process 60 according to an example of the present invention. The process 60 may be utilized in a network (e.g., the network 200, the eNB 2002 and/or the EPC 2004) shown in FIG. 2, to handle a D2C communication in a TDD system. The process 60 may be compiled into the program code 314 and includes the following steps:

Step 600: Start.

Step 602: Perform a retransmission according to an initial transmission or a predetermined redundancy version of the initial transmission, when a HARQ feedback corresponding a previous transmission is not received.

Step 604: End.

According to the process 60, the network may perform a retransmission according to an initial transmission (e.g., cellular transmission) or a predetermined redundancy version of the initial transmission, when a HARQ feedback corresponding to (e.g., in response to) a previous transmission is not received. That is, the network determines that the previous transmission is not received by a UE (e.g., the UE 202 or the UE 204) successfully, if the HARQ feedback (e.g., ACK or NACK) is not received from the UE. The previous transmission may be the initial transmission or another retransmission of the initial transmission. Correspondingly, the UE may simply drop the HARQ feedback and perform a D2D transmission, when a collision between the HARQ feedback and the D2D transmission occurs. That is, a priority of the D2D transmission may be higher than a priority of the D2C transmission. Thus, the collision between the D2C communication and the D2D communication is solved.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method for arranging resources to the D2D communication and the D2C communication. According to the present invention, the network can separate the resources according to a reference configuration, after the reference configuration is selected from configuration candidates. Thus, the collision between the D2D communication and the D2C communication is solved. In addition, a dropping rule is designed for the collision between the D2D communication and the D2C communication. A UE drops a HARQ feedback corresponding to a D2C transmission, if the D2C transmission collides with a D2D transmission. Correspondingly, the network simply performs a retransmission if the HARQ feedback is not received.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for handling resources for a device-to-device (D2D) communication in a time-division duplexing (TDD) system, comprising:
a storage unit for storing instructions of:
selecting a reference configuration for at least one downlink (DL) transmission of a communication device from a plurality of configuration candidates;
determining at least one uplink (UL) subframe for the D2D communication of the communication device according to the reference configuration;
transmitting information of the reference configuration to the communication device;
transmitting information of the at least one UL subframe to the communication device; and
performing the at least one DL transmission with the communication device according to the reference configuration; and
a processing means, coupled to the storage unit, configured to execute the instructions stored in the storage unit.

2. The network of claim 1, wherein the at least one UL subframe is determined based on that at least one direction of the at least one UL subframe is not UL according to the reference configuration.

3. The network of claim 1, wherein the reference configuration is selected according to at least one of a DL traffic condition of the communication device, an interference level, a cell loading of the network and a D2D resource requested by the communication device.

4. The network of claim 1, wherein the reference configuration is selected semi-statically or statically.

5. The network of claim 1, wherein the selection of the reference configuration is predetermined in the 3rd Generation Partnership Project (3GPP) standard.

6. The network of claim 1, wherein the information of the reference configuration is transmitted via a higher layer signaling or a physical layer signaling, or the information of the at least one UL subframe is transmitted via a higher layer signaling or a physical layer signaling.

7. The network of claim 1, wherein a physical layer signaling is scrambled with a corresponding Cell Radio Network Temporary Identifier (RNTI), when the information of the reference configuration or the information of the at least one UL subframe is transmitted via the physical layer signaling.

8. The network of claim 1, wherein the information of the reference configuration or the information of the at least one UL subframe is transmitted via a physical layer signaling, and the physical layer signaling is allocated in a corresponding communication device-specific search space.

9. The network of claim 1, wherein a UL/DL configuration of the communication device and the reference configuration are different.

10. The network of claim 1, wherein the plurality of configuration candidates are determined according to Enhanced Interference Mitigation and Traffic Adaptation (eIMTA).

11. A network for handling resources for a device-to-device (D2D) communication in a time-division duplexing (TDD) system, comprising:
a storage unit for storing instructions of:
determining at least one uplink (UL) subframe for the D2D communication of a communication device;
selecting a reference configuration for at least one downlink (DL) transmission of the communication device from a plurality of configuration candidates according to the at least one UL subframe;
transmitting information of the reference configuration to the communication device;
transmitting information of the at least one UL subframe to the communication device; and
performing the at least one DL transmission with the communication device according to the reference configuration; and
a processing means, coupled to the storage unit, configured to execute the instructions stored in the storage unit.

12. The network of claim 11, wherein the reference configuration is selected based on that at least one direction of the at least one UL subframe is not UL according to the reference configuration.

13. The network of claim 11, wherein the reference configuration is selected according to the at least one UL subframe and at least one of a DL traffic condition of the communication device, an interference level, a cell loading of the network and a D2D resource requested by the communication device.

14. The network of claim 11, wherein the reference configuration is selected semi-statically or statically.

15. The network of claim 11, wherein the selection of the reference configuration is predetermined in the 3rd Generation Partnership Project (3GPP) standard.

16. The network of claim 11, wherein the information of the reference configuration is transmitted via a higher layer signaling or a physical layer signaling, or the information of the at least one UL subframe is transmitted via a higher layer signaling or a physical layer signaling.

17. The network of claim 11, wherein a physical layer signaling is scrambled with a corresponding Cell Radio Network Temporary Identifier (RNTI), when the information of the reference configuration or the information of the at least one UL subframe is transmitted via the physical layer signaling.

18. The network of claim 11, wherein the information of the reference configuration or the information of the at least one UL subframe is transmitted via a physical layer signaling, and the physical layer signaling is allocated in a corresponding communication device-specific search space.

19. The network of claim 11, wherein a UL/DL configuration of the communication device and the reference configuration are different.

20. The network of claim 11, wherein the plurality of configuration candidates are determined according to Enhanced Interference Mitigation and Traffic Adaptation (eIMTA).

* * * * *